Patented Nov. 24, 1953

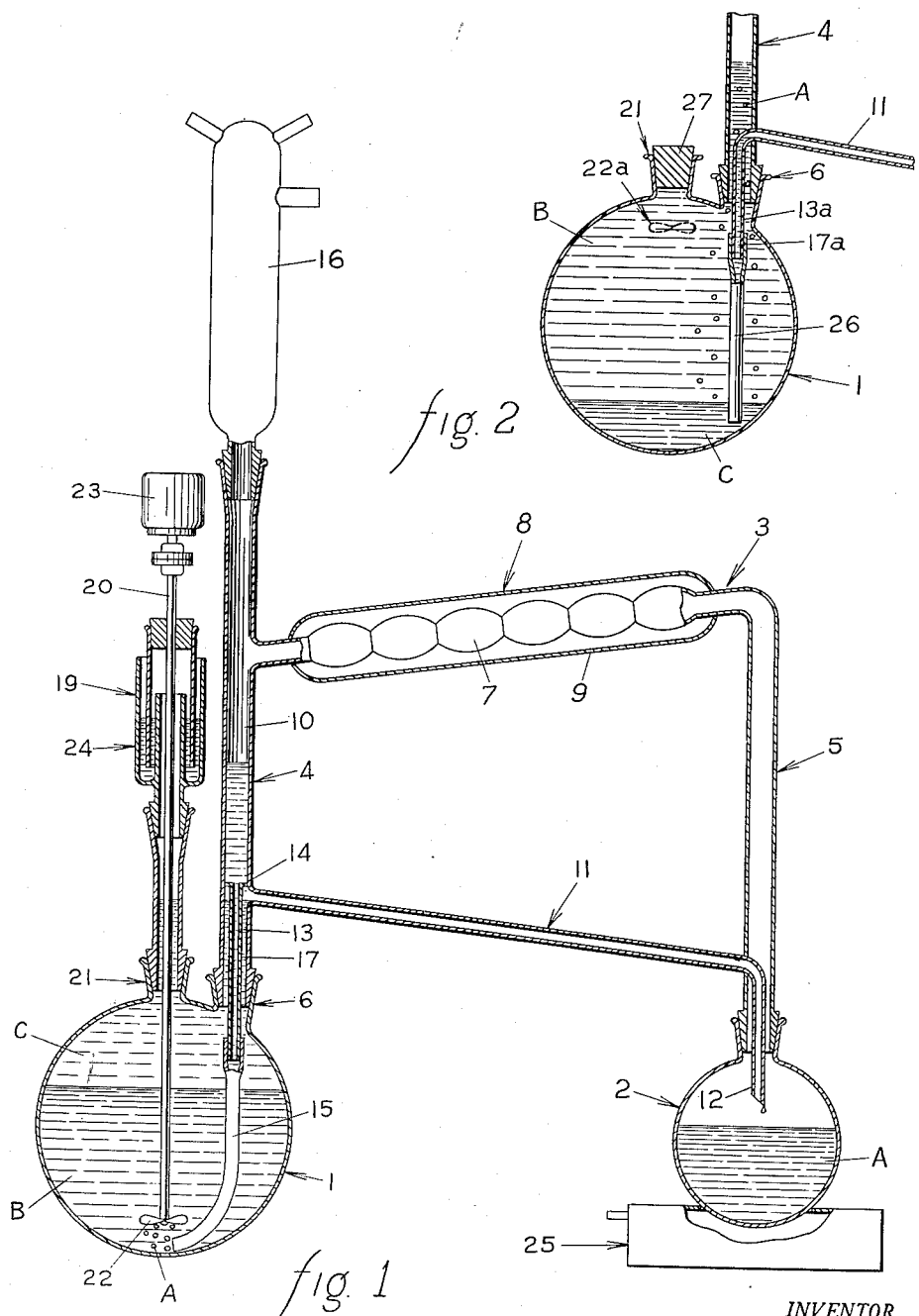

2,660,518

UNITED STATES PATENT OFFICE 2,660,518

HIGH-SPEED CONTINUOUS EXTRACTOR

John L. White, Kalamazoo, Mich., assignor to The Upjohn Company, a corporation of Michigan Application February 19, 1951, Serial No. 211,750

7 Claims. (Cl. 23—267)

This invention relates in general to apparatus for effecting continuous extraction of a liquid solution by a solvent of different specific gravity than said solution, and essentially non-miscible therewith. It refers more particularly to such an apparatus which will accomplish such extraction at a higher rate than previously possible.

A common method and means of extracting materials from a liquid solution, such as an aqueous solution, is to place the solution and an organic solvent, such as ether, in a receptacle, such as a separatory funnel, shake them together thoroughly, pour off the ether and then distill it, thereby leaving as a residue the material originally dissolved in the water. It has long been recognized that this procedure is inefficient and subject to contamination.

Accordingly, a primary object of this invention is the provision of an apparatus whereby continuous extraction of a material from an aqueous solution by a solvent, such as ether, may be carried out entirely automatically and at a higher rate than has previously been possible.

A further object of this invention is the provision of an apparatus, as aforesaid, wherein the possibility of leakage, spilling, and escape of vapors is substantially eliminated.

Other objects and purposes of this invention will become apparent to persons acquainted with this type of equipment upon referring to the accompanying drawing and the following specification.

In the drawing:

Figure 1 illustrates a verical, central cross-section of an apparatus embodying the invention.

Figure 2 shows a fragment of Figure 1 modified.

General construction

In meeting those objects mentioned above, as well as others incidental thereto and associated therewith, I have provided a pair of receptacles, such as flasks, one of which is for containing a solution, as aqueous, including a material to be extracted therefrom and the other of which is for containing an extraction solvent, such as ether, of different specific gravity than said solution and substantially non-miscible therewith. The two flasks are connected by a device comprising first and second, substantially vertical and parallel pipes. The first pipe, which is associated with the solution flask, is open at both its upper end and its lower end and the second pipe, associated with the solvent flask, is closed at its upper end and open at its lower end, said open lower ends providing communication with the respective flasks. Points near the upper ends of each thereof are connected by a condenser sloping from the second pipe to the first pipe.

A vertical passageway is provided in the lower end of the chamber defined by the first pipe, which passageway is closed at its upper end, open at its lower end and of less cross-sectional area than that of said chamber wherein said passageway is disposed. A drain pipe is provided between the two vertical pipes so that it communicates with the passageway near the upper end thereof, slopes toward and extends through the second pipe and has a portion thereof which extends co-axially and downwardly through the second pipe into the solvent flask. A reflux condenser may be associated with the upper, open end of the first pipe. Means is sometimes provided in the flask for agitating the solution to increase dissolving of said material by the solvent. Means is preferably provided for heating the solvent flask.

The apparatus, to which this invention relates, may be used with a wide variety of organic extraction solvents in addition to ether, such as benzene, toluene, hexane, methyl ethyl ketone, butyl alcohol, chloroform, methylene chloride and other halogenated hydrocarbons, some of which are heavier than the solution, such as aqueous, containing the material to be extracted. The particular embodiment of the invention disclosed in Figure 1 illustrates an apparatus in which the said material is extracted from a solution having a higher specific gravity than the solvent. For purposes of illustration, only, the structure and operation of my invention are hereinafter disclosed primarily with reference to the apparatus in Figure 1, wherein an aqueous solution and the solvent ether are assumed for illustrative purposes.

For the purpose of convenience in description, the terms "leftward," "rightward," "upper" and "lower," or derivatives thereof, will have reference to the apparatus and parts thereof as appearing in the drawing. However, such terminology is used with no intention of limiting the scope of my invention.

Detailed construction

Referring to the drawing, Figure 1 illustrates a continuous extraction apparatus comprising a solution flask 1 and a solvent flask 2, the solvent flask 2 having a single opening in the top thereof and the solution flask 1 having, in this particular embodiment, two openings in the top thereof. The flasks 1 and 2 are connected by an extractor head 3 as hereinafter described.

First and second, substantially vertical and parallel pipes 4 and 5 are positioned, as appearing in Figure 1, so that the first pipe 4 is on the left end of the head and the second pipe 5 is on the right end of the head. The second pipe 5 is inserted in a conventional, liquid tight manner into the mouth of the solvent flask 2 and the first pipe 4 is inserted in a conventional, liquid tight manner into the mouth 6 of the solution flask 1. The lower ends of both the first and second pipes are open and communicate thereby with said flasks.

The upper end of the second pipe 5 is integral with or secured to one end of the inner tube 7 of the condenser 8, the other end of said inner tube 7 communicating with the chamber 10 defined by the first pipe 4 at a point spaced slightly downwardly from the upper end thereof and below the upper end of the pipe 5. Thus, the inner tube 7 slopes downwardly from the second pipe 5 to the first pipe 4. The condenser 8 is provided with a water jacket or housing 9 of a conventional type, surrounding the inner tube 7 between the first and second pipes.

An inner pipe 13 is disposed co-axially within, and spaced from the walls of, the lower portion of the chamber 10 in the pipe 4 and combines with said pipe 4 to define a vertical passageway 17 therebetween which passageway opens through the lower end of the pipe 4. The upper end of the passageway 17, which is disposed intermediate the lower end of the pipe 4 and the tube 7 of the condenser 8, is closed by a circular wall 14 which extends between the upper end of the pipe 13 and the wall of the chamber 10. Both the upper and lower ends of the pipe 13 are open. A tube 15 is connected to the lower end of the pipe 13 and extends downwardly therefrom into the lowermost part of the solution flask 1.

A drain pipe 11 communicates at one end thereof with the passageway 17 near the upper end thereof. The other end of the drain pipe 11 extends through an opening in the sidewall of the second pipe 5 and has a portion 12 disposed co-axially within, and spaced from the wall of, the pipe 5 and extends downwardly through the lower end thereof. The drain pipe 11 slopes downwardly from the first pipe 4 to the second pipe 5 at a sufficient angle to effect efficient flow of liquid from left to right.

The junction between pipe 4 and the tube 7 of condenser 8 is placed sufficiently above the flask 1 to provide whatever head is required to move the ether downwardly through the tube 15 and out the bottom thereof. This positioning will be a function of the maximum operating depth of said solution, in said flask 1, usually about two-thirds the height of the cylindrical, body portion of the flask 1, and the difference between the specific gravities of the solution and the ether. The junction of the passageway 17 and the drain pipe 11 is placed close enough to the flask 1 to be well below the minimum height of ether in the chamber 10, whereby the ether entering said drain pipe will always be under sufficient head to keep it flowing rapidly.

A reflux condenser 16 may be connected to the upper end of the first pipe 4 for reasons discussed hereinafter.

A stirring mechanism 19, having a shaft 20 extending through the mouth 21 in the solution flask 1, is in this embodiment mounted directly above said solution flask so that the stirring paddle 22 secured to the lower end of the shaft 20 is disposed within, and near the bottom of, the solution flask 1. The shaft 20 is driven by a motor 23, preferably of the variable speed type, and a seal of any conventional type, such as a mercury seal 24, is provided around the shaft 20 and mounted upon the solution flask 1, to prevent escape of vapors from said flask. This seal is preferably disposed at a point higher than the maximum height of ether in passageway 17. The stirrer may, however, be eliminated without departing from the scope of my invention and normally will be so eliminated where the solution in question is of low viscosity. Of course, if the stirrer is removable, the opening 21 is likewise eliminated or closed, as shown in Figure 2. A conventional heating means, such as a steam bath 25, is provided under the solvent flask 2 for the purpose of vaporizing the extraction solvent, such as ether, therein.

The tube 15 in this embodiment is flexible for convenience in reaching the lowermost part in the flask 1 without fouling the agitator blades 22. However, any tube will be satisfactory if it discharges into the lower part of the flask and avoids interference with the agitator, where an agitator is used.

*Operation*

In order to operate the apparatus shown in Figure 1, the solvent flask 2 is filled with a suitable extraction solvent A, such as ether, selected according to conventional practice, and, in this particular embodiment, an aqueous solution B is placed in the solution flask 1 to a depth of from two-thirds to three-fourths of the height of the body of the flask. The extraction head 3 is then mounted so that the first pipe 4 extends into the mouth 6 of the solution flask 1, and the second pipe 5 extends into the mouth of the solvent flask 2, the flexible tube 15 having first been connected to the lower end of the inner pipe 13. The reflux condenser 16 is then placed upon the upper end of the first pipe 4 and the stirring mechanism 19, if used, is assembled upon the solution flask 1 in association with the mouth 21 thereof. The placement of the paddle 22 with respect to the flask will be adjusted if necessary to effect agitation of the solution near the bottom portion of the flask but not in the upper portion. If said stirrer is not to be used, the mouth 21 will be closed.

The solvent flask is heated by the steam bath 25, thereby vaporizing the ether. The vaporized ether rises through the second pipe 5 and passes through the inner tube 7 of the condenser tube 8, where it is condensed, flows into the first pipe 4 and then down through the inner pipe 13 and tube 15 to the lower part of the solution flask 1. As soon as sufficient liquid ether has accumulated in the tube 15, the inner pipe 13 and first pipe 4 to compensate for the difference between the specific gravities of the ether and aqueous solution, the ether will be forced out of the bottom end of the tube 15 into the aqueous solution in the solution flask 1, adjacent to paddle 22 of the stirring mechanism 19, which is already in operation.

As the ether bubbles out of the tube 15, it is emulsified into the aqueous solution by the paddle 22, thereby increasing the rate at which the material to be extracted from the solution is dissolved into the ether. The stirring mechanism 19 is operated so that the lower layer of the solution will be agitated, thereby effecting such emulsification, but the upper layer will not be materially disturbed. Thus, after said material is dissolved by the ether, the ether will separate out of the aqueous solution and rise to form a layer C of ether on top of the solution.

When the ether layer rises through the mouth 6 and the passageway 17 to the level of the drain pipe 11, it will flow therethrough back into the solvent flask 2, carrying with it the extracted material.

The material dissolved in the ether will, upon reaching the solvent flask 2, either separate out and form a separate layer, or will remain in solution with the ether. However, by controlling the heat applied to the solvent flask to vaporize the ether, the extracted material remains in the solvent flask 2. Hence, the process of vaporizing the ether, condensing it in the condenser 8, bubbling it up through the aqueous solution, which may be agitated by the stirring mechanism, forming a layer of ether on top of the aqueous solution which then flows through the drain pipe 11 back into the solvent flask 2 may be continued indefinitely or until satisfactory extraction of the material in the aqueous solution has been completed.

The reflux condenser 16 mounted on the upper end of the first pipe 4 is provided for the purpose of condensing any stray vapors of ether which might escape condensation in the condenser 8. However, the reflux condenser must have an opening to atmosphere to prevent the building up of pressure within the extraction head which might cause an explosion.

The apparatus shown in Figure 1 is modified according to Figure 2 where the solvent A has a higher specific gravity than the solution B, and, accordingly, the layer C of solvent is at the bottom of the solvent flask 1 (Figure 2). The pipe 13a, defining the passageway 17a communicating with the drain pipe 11, has a tube 26 attached thereto. Said tube 26 extends down into the layer C in the bottom of the flask.

If a stirring mechanism 19 is used with this apparatus, it may be mounted as shown in Figure 1, except that the paddle is disposed as shown in broken lines at 22a in Figure 2, near the top of the flask. If no stirring mechanism is used, the mouth 21 may be sealed with a stopper 27 or eliminated.

In this apparatus, the solvent is vaporized and condensed, as described above, and flows through the pipe 4 into the flask 1. Being heavier than the solution, the solvent A settles down through the solution B and forms a layer C in the bottom of the flask. The solution is urged up in the pipe 4 (Figure 2), as the layer C of solvent increases, until the head produced by said solution in pipe 4 causes the solvent to rise through the tube 26 and the passageway 17a and flow out through the drain pipe 11. This cycle may then be continued, automatically, as long as desired or required.

It has been found that, with the apparatus described hereinabove, solvent can be cyclized at a much higher rate than previously possible through a solution from which a material is to be extracted with no flooding or leakage, and with excellent results. It has also been found that once the setup is arranged, either as shown in Figure 1 or as modified in Figure 2, the operation is entirely automatic and does not require continuous attention by an operator.

Although the above mentioned drawing and description apply to one particular preferred embodiment of my invention, it is not my intention, implied or otherwise, to eliminate other variations or modifications which do not depart from the scope of the invention unless specifically stated to the contrary in the hereinafter appended claims.

I claim:

1. In an apparatus for continuous extraction, a device comprising: first and second, substantially parallel and vertical pipes, said first pipe being open at both ends and said second pipe being open at its lower end and closed at its upper end; a condenser having an outer casing and an inner tube, said inner tube communicating at one end with said second pipe at its upper end and communicating at its other end with said first pipe near its upper end, said inner tube being sloped downwardly from said second pipe to said first pipe; a drain pipe between said first and second pipes communicating at one end with said first pipe intermediate its lower end and said inner tube and extending through an opening in the sidewall of said second pipe intermediate its ends, said drain pipe being secured to the wall of said opening, being sloped downwardly from said first pipe to said second pipe and having a portion thereof coaxially disposed within and spaced from the walls of said second pipe and extending through the lower end thereof; an open ended inner pipe coaxially disposed within said first pipe within and spaced from the walls of the first pipe, said inner pipe extending from a point intermediate said inner tube and said drain pipe through the lower end of said first pipe; and a circular wall integral with and extending between the upper end of said inner pipe and said first pipe; a solvent receptacle receiving the lower end of said second pipe in liquid tight relationship therewith; means for heating said solvent receptacle; a solution receptacle having a first opening in its upper portion receiving in liquid tight relationship therewith the lower end of said first pipe; a conduit extending from the lower end of said inner pipe to a point near the bottom of said solution receptacle.

2. Apparatus as defined in claim 1 in which said solution receptacle having also a second opening in its upper portion; and continuously operable agitating means extending through said second opening and adapted for effecting agitation of liquid within said solution receptacle near the bottom thereof and effecting substantially no agitation of such liquid within the upper portion of said solution receptacle.

3. In an apparatus for continuous extraction, a device comprising: a first substantially vertical pipe adapted for liquid tight connection near its lower end with a solution receptacle and said pipe having two passageways therein, the first passageway being closed at its upper end and being open at its lower end at a point below said liquid tight connection and the second passageway being open at both its ends and terminating at a point substantially below the lower end of said first passageway; a second substantially vertical pipe adapted for liquid tight connection near its lower end with a solvent receptacle, closed at its upper end and open at its lower end; a condenser having an inlet end and an outlet end, and arranged for closed communication at its inlet end with the upper end of said second pipe and arranged for closed communication at its outlet end with the upper end of said second passageway; a drain pipe communicating at its inlet end with the said first passageway at a point above said liquid tight connection of said first pipe and communicating at its outlet end with the said second pipe at a point above said liquid tight connection of said second pipe.

4. In an apparatus for continuous extraction, a device comprising: a first substantially vertical pipe open at both ends and adapted for liquid tight connection near its lower end with a solution receptacle; an inner pipe open at both ends within said first pipe and positioned at the lower end thereof and a liquid tight barrier connecting the upper end of said inner pipe with the walls of said first pipe at a point spaced above the point of said liquid tight connection, said inner pipe extending substantially below said first pipe; a second substantially vertical pipe adapted for liquid tight connection near its lower end with a solvent receptacle and open at its lower end; a condenser having an inlet end and an outlet end, and arranged for closed communication at its inlet end with the upper end of said second pipe and arranged for communicating at its outlet end with the upper end of said first pipe; a drain pipe communication at its inlet end with the said first pipe at a point above said liquid tight connection of said first pipe and below said barrier and communicating at its outlet end with the said second pipe at a point above said liquid tight connection of said second pipe.

5. In an apparatus for continuous extraction, a device comprising: first and second, substantially parallel and vertical pipes, said first pipe defining a chamber open at both ends and being adapted for liquid tight connection near its lower end with a solution receptacle, and said second pipe being open at its lower end and closed at its upper end and adapted for liquid tight connection near its lower end to a solvent receptacle; a condenser having an inlet end and an outlet end, said inlet end communicating with said second pipe at its upper end and said outlet end communicating with said first pipe near its upper end; a drain pipe between said first and second pipes communicating at one end with said first pipe at a point thereon spaced below the connection therewith of said condenser and communicating at its other end with the second pipe near the lower end thereof and said drain pipe being sloped downwardly from said first pipe to said second pipe; a liquid tight barrier isolating the upper end of said first pipe from the lower end thereof, said barrier being located at a point intermediate the connection thereto of said condenser and said drain pipe and a further pipe providing communication between the portion of said first pipe above said barrier with a point substantially below the lower end of said first pipe.

6. In an apparatus for continuous extraction, a device comprising: first and second, substantially parallel and vertical pipes, said first pipe defining a chamber open at both ends and said second pipe being open at its lower end and closed at its upper end; a condenser having an inlet end and an outlet end, said inlet end communicating with said second pipe at its upper end and said outlet end communicating with said first pipe near its upper end; a solvent receptacle receiving the lower end of the second pipe in liquid tight relationship therewith; a solution receptacle having an opening in its upper portion receiving in liquid tight relationship therewith the lower end of said first pipe; a conduit independent of said first pipe but communicating with said solution receptacle and extending upwardly therefrom and a drain pipe extending from the upper end of said conduit to said solvent receptacle and sloping downwardly toward said solvent receptacle, and a further conduit connecting said first pipe to a point near the bottom of said solution receptacle.

7. In an apparatus for continuous extraction, the device comprising: first and second, substantially parallel and vertical pipes, said first pipe being open at its upper end and said second pipe being open at its lower end and closed at its upper end; means dividing said first pipe near its lower end into first and second, substantially parallel and vertical passageways, said means extending below the lower end of said first pipe and defining one of said passageways below the end of said first pipe, said one of said passageways thereby extending substantially below the lower end of the other of said passageways, said first passageway being open at both ends and said second passageway being open at its lower end and closed at its upper end; a condenser having an inlet end and an outlet end, said inlet end communicating with said second pipe at its upper end and said outlet end communicating with said first pipe near its upper end; a solvent receptacle receiving the lower end of the second pipe in liquid tight relationship therewith; a solution receptacle having an opening in its upper portion receiving in liquid tight relationship therewith the lower end of said first pipe at a point below the upper ends of said passageways of said first pipe; a drain pipe communicating at its inlet end with the upper end of said second passageway and communicating at its outlet end with said second pipe at a point near the lower end of said second pipe.

JOHN L. WHITE.

References Cited in the file of this patent
UNITED STATES PATENTS

| Number | Name | Date |
|---|---|---|
| 451,816 | Gilbert | May 5, 1891 |
| 2,373,646 | Binnington | Apr. 17, 1945 |